United States Patent
Reeves-Hall et al.

(10) Patent No.: US 8,309,883 B2
(45) Date of Patent: Nov. 13, 2012

(54) METHODS AND SYSTEMS FOR LASER PROCESSING OF MATERIALS

(75) Inventors: Peter Reeves-Hall, Northbridge, MA (US); George BuAbbud, Shrewsbury, MA (US)

(73) Assignee: IPG Photonics Corporation, Oxford, MA (US)

( * ) Notice: Subject to any disclaimer, the term of this patent is extended or adjusted under 35 U.S.C. 154(b) by 300 days.

(21) Appl. No.: 12/783,902

(22) Filed: May 20, 2010

(65) Prior Publication Data

US 2011/0284510 A1    Nov. 24, 2011

(51) Int. Cl.
*B23K 26/00* (2006.01)
(52) U.S. Cl. ............................. 219/121.72; 219/121.67
(58) Field of Classification Search ............ 219/121.72, 219/121.67
See application file for complete search history.

(56) References Cited

U.S. PATENT DOCUMENTS

| | | | | |
|---|---|---|---|---|
| 4,825,035 A | * | 4/1989 | Moriyasu et al. | 219/121.61 |
| 4,959,244 A | * | 9/1990 | Penney et al. | 427/586 |
| 5,705,788 A | * | 1/1998 | Beyer et al. | 219/121.62 |
| 5,968,382 A | * | 10/1999 | Matsumoto et al. | 219/121.72 |

* cited by examiner

*Primary Examiner* — Roy Potter
(74) *Attorney, Agent, or Firm* — Yuri Kateshov; Timothy J. King (57) ABSTRACT

A method of processing a work material using a laser can include directing a laser beam of optical energy from a laser to a work material; processing the work material with the laser beam of optical energy in accordance with at least one processing parameter to modify the work material, the processing of the work material having associated therewith an optical signature; sensing a characteristic of the optical signature; and varying the at least one processing parameter responsive to the sensing of the characteristic of the optical signature. Other related methods are disclosed, as are laser processing systems, which systems can be used to practice the methods.

35 Claims, 7 Drawing Sheets

METHODS AND SYSTEMS FOR LASER PROCESSING OF MATERIALS

FIELD OF THE DISCLOSURE

The present invention relates to methods and apparatus for the laser processing of a work material, such as, for example, a metal, semiconductor, plastic or any other material amenable to processing with electromagnetic radiation.

BACKGROUND OF THE DISCLOSURE

Great strides have been made in recent years in the art of laser processing of materials. Lasers have many advantages over conventional techniques, such as, for example, traditional mechanical approaches used for machining, such as drilling a hole using a drill bit or shaping a material with a rotating end mill. One readily apparent advantage is that a laser process does not include a machine tool that will wear out and need to be refurbished or replaced. There are myriad other advantages known to those of ordinary skill in the art. Processing a work material with a laser can include, by way of example and not limitation, machining, cutting, marking, printing, drilling, ablating, vaporizing, heat treating, such as hardening or annealing, as well as many other operations.

Many types of lasers are known to be useful for the laser processing of materials, such as, for example, gas lasers (e.g., $CO_2$ lasers), bulk solid state lasers (e.g. Nd-YAG lasers) and fiber lasers. Of the types of lasers, fiber lasers in particular have significant advantages. Fiber lasers can have a smaller footprint on a factory floor, can more be efficient, and can have less onerous cooling requirements. Fiber lasers can also provide better laser beam quality (e.g., better $M^2$ factor) than other types of lasers. Fiber lasers have been steadily increasing in power output, and can have power outputs in the kW and multi kW range.

Although much progress has been made in the area of laser processing of materials, problems remain and opportunities for improvement are present. For example, it is always desirable to improve a particular process such that it is faster, more accurate or more efficient (e.g., more efficient in terms of energy consumption or input material consumption, such as conditioning gases or sintering powder delivered to the laser processing site). Laser processing can involve secondary processes not necessarily involved in more traditional material processing, such as, for example, the creation of a plasma in the environment local to the interaction of the laser beam and the work material. The secondary processes can create problems as well as opportunities for improvement.

Accordingly, it is an object of the present disclosure to address one or more of the disadvantages or drawbacks of the art of laser processing of a work material.

SUMMARY OF THE DISCLOSURE

In one aspect, the present disclosure teaches a method of processing a work material using a laser, comprising directing a laser beam of optical energy from a laser to a work material; processing the work material with the laser beam of optical energy in accordance with at least one processing parameter to modify the work material, the processing of the work material having associated therewith an optical signature; sensing a characteristic of the optical signature; and varying the at least one processing parameter responsive to the sensing of the characteristic of the optical signature.

In other aspects of the disclosure, sensing a characteristic of the optical signature can comprise providing a first optical fiber positioned so as to propagate optical energy representative of the optical signature. Directing a laser beam of optical energy from the laser to the work material can comprise providing a delivery optical fiber and propagating optical energy of the laser beam with the delivery optical fiber, and the first optical fiber and the delivery optical fiber can be the same optical fiber. The delivery optical fiber can include a laser head at one end thereof, and the laser head can comprise at least one optical element for conditioning the laser beam of optical energy prior to delivery of the beam to the work material for the processing thereof, and the optical element can in addition facilitate reception by the delivery optical fiber of optical energy representative of the optical signature. Such facilitating can be by, for example, receiving and transmitting, diffracting or scattering the optical energy representative of the optical signature prior to reception by the delivery optical fiber.

In further aspects, the first optical fiber and the delivery optical fiber are not the same optical fiber, and different fibers can be used for each. The first optical fiber and the delivery optical fiber can be bundled together at least along a portion of their respective lengths. The delivery optical fiber can be a multimode fiber and the first fiber can be a single mode fiber. The delivery optical fiber can include a laser head at one end thereof, and the laser head can comprise at least one optical element for conditioning the laser beam of optical energy prior to delivery of the beam to the work material for the processing thereof. Providing the first optical fiber can comprise mounting the first optical fiber with the laser head. The optical element can in addition to conditioning the laser beam, facilitate reception by the first optical fiber of optical energy representative of the optical signature such as by, for example, facilitating an end of the first optical fiber receiving the optical energy representative of the optical signature.

In yet other aspects of the disclosure, sensing a characteristic of the optical signature can comprise sensing optical energy generated by a non-linear process; sensing optical energy of a harmonic of at least a second order of the non-linear process; sensing a wavelength spectrum; sensing an absorption spectrum; sensing optical energy generated by an upconversion process; sensing optical energy generated by a downconversion process; providing a first optical fiber positioned so as to propagate optical energy representative of the optical signature, wherein directing a laser beam of optical energy from the laser to the work material comprises propagating the laser beam of energy between the laser and the work material via a different optical fiber than the first optical fiber; sensing a polarization state of optical energy; and sensing a temporal aspect of optical energy. Sensing a temporal aspect can comprise sensing the variation with time of an intensity versus wavelength distribution of optical energy or sensing a variation of power with time (e.g., the pulse shape). Generally, sensing a temporal aspect can include sensing the variation of time with any appropriate characteristic of the optical signature, including any such characteristic noted in the present disclosure. The optical signature can comprise the radiation of optical energy and sensing a feature of the optical signature can comprise sensing a feature of radiated optical energy.

In even further aspects of the disclosure, processing the work material with the laser beam of optical energy includes creating a local processing environment, and wherein sensing a characteristic of the optical signature comprises sensing a feature of the local processing environment. The laser beam of optical energy can comprise one or more wavelengths and sensing at least one characteristic of the optical signature can comprise sensing optical energy having a wavelength other than a wavelength comprised by the laser beam of optical energy. The laser beam of optical energy can comprise a first wavelength having an intensity that is higher than another wavelength comprised by the laser beam of optical energy, and sensing at least one characteristic of the optical signature can comprise sensing so as to be most responsive to the another wavelength.

In additional aspects of the disclosure, the method can comprise determining, responsive to sensing a characteristic of the optical signature, a temperature associated with the processing of the work material with the laser beam of optical energy and varying at least one processing parameter responsive to the sensing of the at least one optical feature of the optical signature can comprise varying at least one processing parameter responsive to the determined temperature. Processing the work material with the laser beam of optical energy can comprise positioning the laser beam of optical energy relative to the work material, and varying the at least one processing parameter can comprise varying the positioning of the laser beam of optical energy relative to the work material. Varying the positioning of the laser beam of optical energy relative to the work material can comprise, for example, one or more of varying the speed of relative movement between the work material and the laser beam of optical energy and varying an angle between the laser beam of optical energy and a surface of the work material.

In yet more aspects, a method of the present disclosure can comprise directing a flow of material to the work material, and varying the at least one processing parameter can comprise varying at least one of the flow and constitution of the material. The material can comprise a sintering material to be sintered by the laser beam of optical energy. As another example, the material can comprise a gas, such as a shielding gas.

In even other aspects of the disclosure, varying the at least one processing parameter can comprise one or more of varying the optical power of the laser beam of optical energy; varying the spot size of the laser beam of optical energy; varying the polarization state of the laser beam of optical energy; and varying the wavelength of the laser beam of optical energy. A method according to the disclosure can comprise focusing the laser beam of optical energy, and varying the at least one processing parameter can comprise varying the focus, such as the focal point or focal depth of the laser beam of optical energy. The laser beam of optical energy can comprise a pulsed laser beam, and varying the at least one processing parameter can comprise varying at least one of the pulse energy, pulse duration, pulse repetition rate or duty cycle of the laser beam of optical energy. The laser beam of optical energy can comprise a pulsed laser beam of optical energy having a wavelength, and sensing a characteristic of the optical signature can comprise providing a first optical fiber positioned so as to receive and propagate optical energy representative of the optical signature, where the first optical fiber is single mode at the wavelength.

Also within the scope of the present disclosure are systems, including laser processing systems for practicing aspects of the methods noted above.

For example, in one aspect of the disclosure, there is provided a laser processing system that can comprise a laser for providing a laser beam of optical energy for processing a work material, the laser processing of the work material having associated therewith an optical signature; an optical waveguide constructed and arranged for propagating first optical energy representative of a characteristic of the optical signature; the laser system including a controller and being constructed and arranged such that the controller is in communication at least with the laser for controlling at least one processing parameter of the laser processing of the material responsive to the first optical energy. The laser can comprise a fiber laser and the system can comprise a delivery optical fiber for delivering the laser beam of optical energy from the fiber laser toward the work material. The delivery optical fiber can also be the optical waveguide and hence propagate the first optical energy representative of the optical signature. The laser processing system can comprise a laser head at one end of the delivery optical fiber, the laser head comprising at least one optical element for conditioning the laser beam of optical energy prior to delivery of the beam to the work material for the processing thereof. The optical element can in addition facilitate reception by the delivery optical fiber of optical energy representative of the optical signature.

In other aspects of the disclosure, the laser can comprise a fiber laser and the laser system can comprise a delivery optical fiber for delivering the laser beam of optical energy from the fiber laser toward the work material and the delivery optical fiber does not comprise the optical waveguide. The laser system can comprise a laser head at one end of the delivery optical fiber, the laser head comprising at least one optical element for conditioning the laser beam of optical energy prior to delivery of the beam to the work material for the processing thereof. The first optical fiber can be mounted with the laser head for facilitating the first optical fiber receiving the optical energy representative of the optical signature. The optical element can also facilitate the reception of the optical energy representative of the optical signature by the first optical fiber. The first optical fiber and the delivery optical fiber can be bundled together at least along a portion of their respective lengths. The delivery optical fiber can comprise a multimode fiber and the first optical fiber can comprise a single mode optical fiber.

In other aspects of a laser processing system according to the present disclosure, the controller can vary the at least one processing parameter responsive to a wavelength spectrum of optical energy; responsive to a temporal aspect of optical energy of the optical signature; responsive to an intensity versus wavelength distribution of optical energy; or responsive to a polarization state of optical energy. The laser beam of optical energy can comprise one or more wavelengths and the controller can vary the at least one processing parameter responsive to a wavelength other than a wavelength comprised by the laser beam of optical energy. The laser beam of optical energy can comprise a first wavelength having an intensity that is higher than that of another wavelength comprised by the laser beam of optical energy, and the controller can vary the at least one processing parameter in a manner most responsive to optical energy having the another wavelength.

In a further aspect of the disclosure, the controller of a laser processing system can be configured to determine, responsive to the first optical energy, a temperature associated with the processing of the work material with the laser beam of optical energy and to vary the at least one processing parameter responsive to the determined temperature.

In additional aspects of the disclosure, a laser processing system can include a laser head for conditioning the laser beam of optical energy before the laser beam is delivered to the work material and the controller controlling the at least one processing parameter responsive to the first optical energy propagated by the optical waveguide comprises the controller varying the conditioning of the laser beam by the laser head. The laser head can include optical elements, such as lenses, for collimating or focusing the laser beam of optical energy. The laser head can receive the laser beam of optical energy from the laser, which can be delivered to the laser head from the laser via a delivery optical fiber.

The optical waveguide can comprise an optical fiber that is associated with the laser head, such as, for example, by being terminated within, or mounted with, the laser head. Optical energy representative of the optical signature can be received by the optical fiber within the laser head, and the optical energy may be affected by one or more optical elements associated with the laser head before being received by the optical fiber as first optical energy. For example, the laser head can include laser beam conditioning optical elements for conditioning the laser beam of optical energy prior to delivery to the work material, and the optical energy may be affected by one or more of these optical elements prior to being received by the optical fiber. The optical elements can, in addition to transmitting the laser beam of optical energy in one direction, collect the optical energy and transmit that energy in the opposite direction and even condition the optical energy before it is delivered to the optical fiber. The optical energy may simply be scattered or diffracted off of one or more optical elements of the laser head before reception by the optical fiber. The laser head can include optical elements that condition the first optical energy and that do not substantially condition the laser beam of optical energy. The optical fiber can be associated with the laser head and simply receive the optical energy without the aid of conditioning optical elements that are separate from the optical fiber. For example, the optical fiber may simply be mounted with the laser head, such as, for example, on the outside of the laser head, so that it conveniently travels with (or simply remains with the laser head if the laser head is stationary and the work material moves) as the laser head is positioned relative to the work material, such as by a positioning system included with the laser processing system.

In additional aspects of the disclosure, a laser processing system can comprise a positioning system for positioning the laser beam of optical energy relative to the work material, and the controller can vary the positioning of the laser beam of optical energy relative to the work material responsive to the first optical energy propagated by the optical waveguide. The positioning system can vary the angle between a surface of the work material and the laser beam and/or vary the translation of the beam of optical energy relative to the work material. The work material may remain stationary and the laser beam of optical energy be positioned, such as by translating, tilting or rotating a laser head, or the laser head can remain stationary and a positioning bed mounting the work material be translated, tilted or rotated. In some practices both the laser head and positioning bed can have their respective positions changed in some manner (e.g., tilted, translated, rotated, etc.) by the positioning system.

In yet a further aspect of the disclosure, a laser processing system can comprise a material delivery system for delivering a flow of selected material to the area where the laser beam of optical energy interacts with the work material. The controller's controlling at least one processing parameter responsive to the first optical energy propagated by the optical waveguide can comprise the controller varying the flow or constitution of the selected material. The selected material can comprise a sintering material to be sintered by the laser beam of optical energy. The selected material can comprise a gas, such as a shielding gas.

The laser processing system can also include an analysis unit for facilitating varying a process parameter responsive to a characteristic of the optical signature. The analysis unit can convert first optical energy to electrical signals for provision to the controller. The laser head and analysis unit can be integrated into one unit. Controller, as the term is used herein, can refer to one controller or to different controllers whose behavior in the aggregate effectuates appropriate control of the laser processing system. The laser head can be integrated into one unit with the controller. The positioning system and controller can be integrated into one unit.

Generally speaking, a laser processing system can include appropriate hardware, including communications hardware, and associated programming to effectuate the aspects of the methods described herein, alone or in combination, as will be appreciated by one of ordinary skill in the art who is cognizant of the present disclosure. For example, in a laser processing system where the laser beam of optical energy comprises a pulsed laser beam, the controller can adjust at least one of the pulse energy, pulse duration, pulse repetition rate or duty cycle of the laser beam of optical energy responsive to a characteristic of the optical signature.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

SPECIFIC DESCRIPTION

Figure 1A:
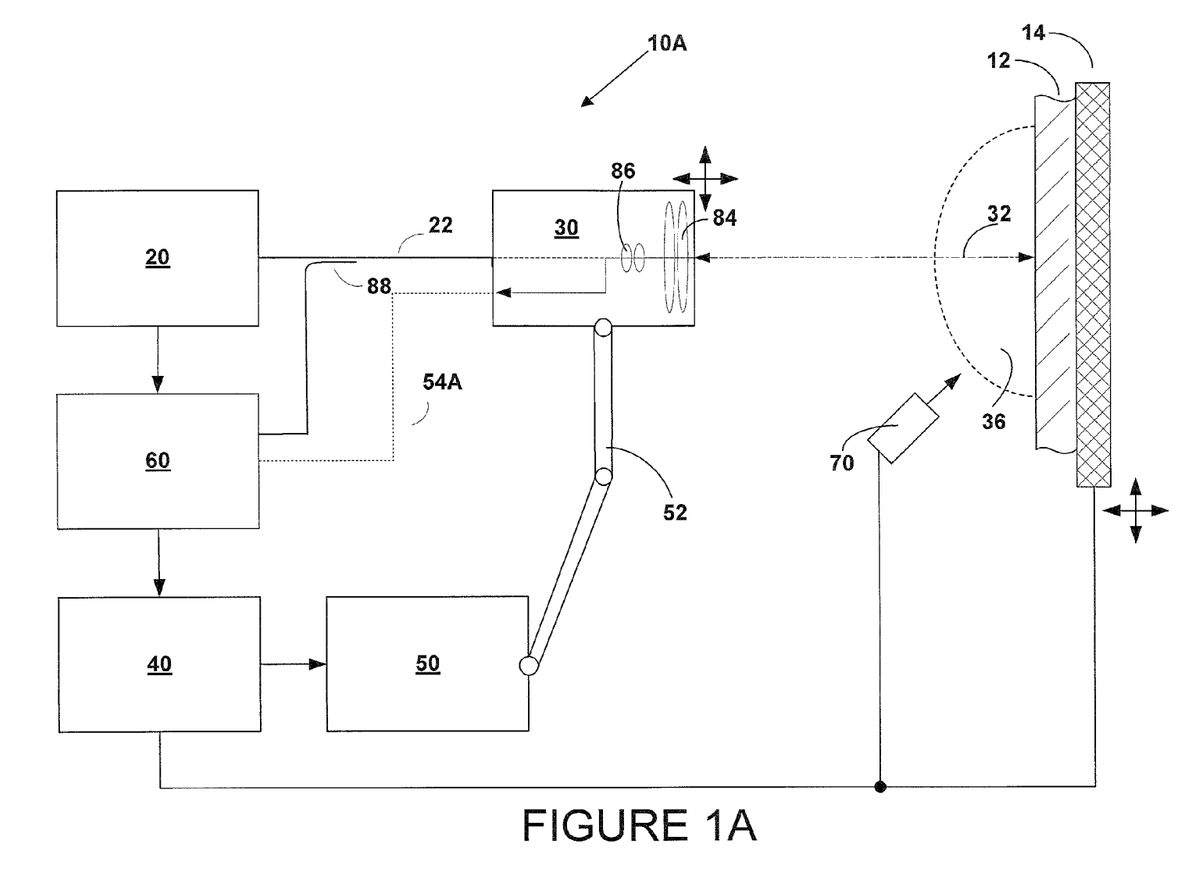
FIG. 1A schematically illustrates a first example of a laser processing system for processing a work material.
Figure 1B:
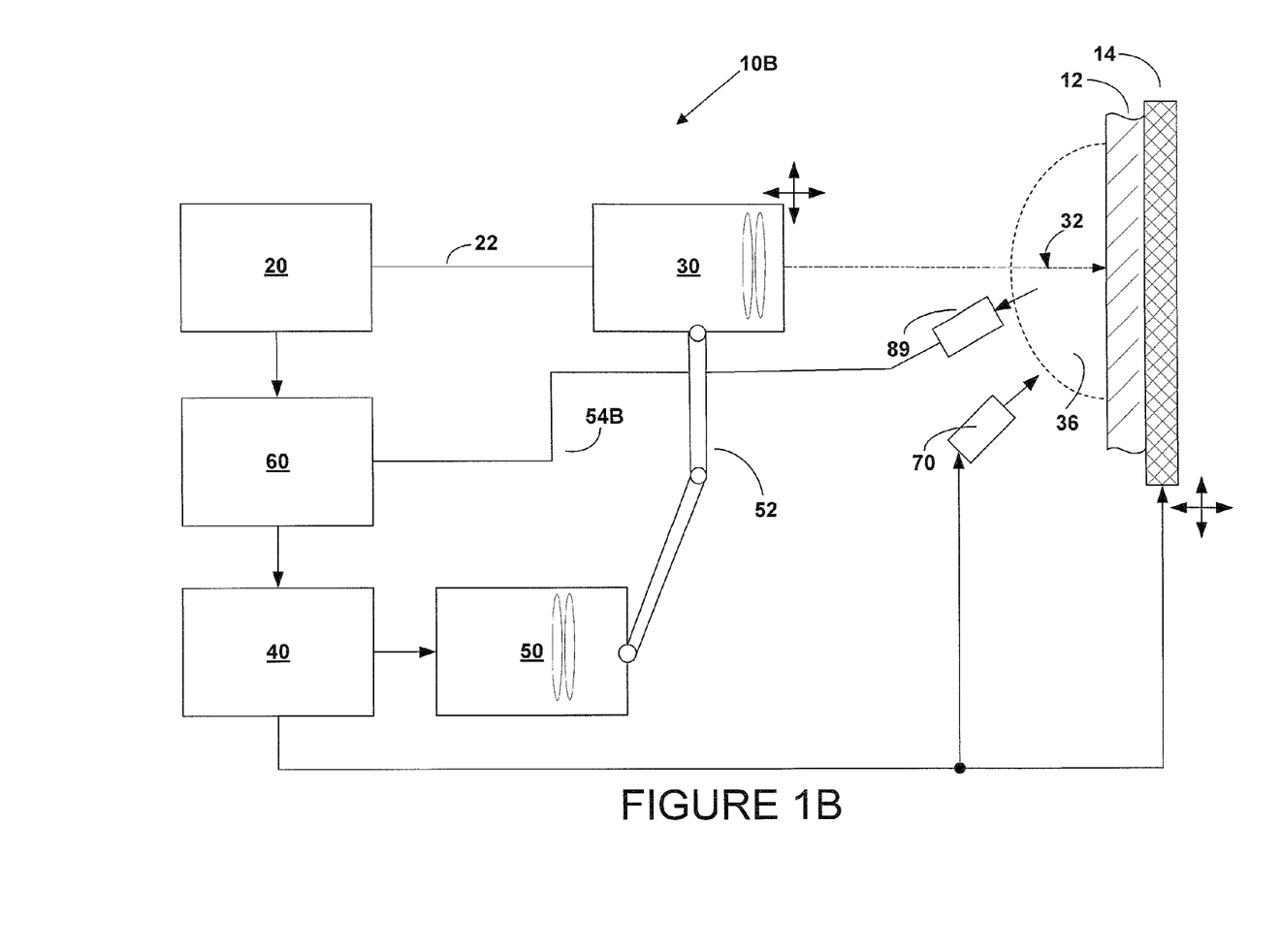
FIG. 1B schematically illustrates a second example of a laser processing system for processing a work material.

FIGS. 1A and 1B schematically illustrate examples according to the disclosure of laser processing systems 10A and 10B, respectively, that can be used to process a work material 12 mounted on a work bed 14. Laser processing systems 10A and 10B share certain features in common. To facilitate discussion, FIGS. 1A and 1B are generally described together and share certain reference numerals. Certain differences between the laser processing systems 10A and 10B are shown in FIGS. 1A and 1B and/or are described below.

The laser processing systems 10A and 10B can comprise a laser 20 (e.g., a fiber laser) and a delivery optical fiber 22 for delivering optical energy from the laser 20 to the laser head 30, which can condition (e.g., collimate, focus, etc.) the laser beam of optical energy 32 for delivery of the beam to the work material 12. The processing of the work material 12 can include the formation of a local environment 36, as discussed in more detail below. By way of example, processing, as used herein, can include machining, cutting, marking, printing, drilling, ablating, vaporizing, heat treating, such as hardening or annealing, as well as many other operations.

The laser processing systems 10A and 10B can further comprise a controller 40 for controlling the processing of the work material 12 by the laser beam of optical energy 32 according to at least one processing parameter, which can comprise, for example, a desired positioning of the laser beam of optical energy 32 relative to the work material 12. For example, the controller 40 can control a positioning system 50 that mounts the laser head 30 on an articulated arm 52 for translation of the laser head 30 along, or rotation of the laser head 30 about, a selected axis or selected axes. The work bed 14 can include provision for its translation or rotation about or translation along a selected axis or selected axes, and the controller 40 can control one or both of the positioning of the work bed 14 and the laser head 30. As one of ordinary skill can readily appreciate, many other processing parameters are appropriate as well. The controller 40 can control, for example, one or more of the modes of operation (pulsed, continuous wave (CW), quasi-CW, etc.) of the laser 20 as well as the output power, wavelength, pulse width, pulse repetition frequency, duty cycle, or pulse energy of pulses provided by the laser. The laser 20 can comprise a CW laser capable of producing primarily long pulses. As another example, laser 20 can comprise a Q-switched laser generating nanosecond pulses or an ultrafast laser, such as a picosecond or femtosecond laser. The controller 40 can control the laser head 30 for varying the spot size, focal length, focal depth, etc. of the laser beam of optical energy 32. The laser head 30 can comprise one or more non-linear elements for wavelength conversion such that the laser beam of optical energy used for laser processing can comprise a wavelength that is different from the optical wavelength(s) produced by the laser 20.

The laser processing systems 10A and 10B of FIGS. 1A and 1B, respectively, can include a material delivery system 70 to deliver a flow of material to the local environment 36. The material delivery system 70 can deliver a gas, liquid, or solid to the work material 12, such as, for example, the aforementioned shielding gas or sintering powder. The gas delivered by the material delivery system 70 to the work material 12 could comprise an inert gas such as nitrogen, helium, or argon to reduce oxidation during a welding procedure. Alternatively, the gas delivered by the material delivery system 70 to the work material 12 can comprise oxygen in order to enhance a burning or cutting operation. The material delivery system 70 can be combined with the positioning system 50 in the laser processing systems 10A and 10B to control, for example, sintering operations or temperature in cutting operations. The laser processing systems 10A and 10B can be configured such that the controller 40 varies a process parameter related to the material delivery system 70 (flow rate, constituents, etc.).

The laser processing of the work material 12 can involve formation of a local environment 36 near the location where the laser beam of optical energy 32 interacts with the work material 12. The local environment 36 can include material derived directly or indirectly, or in whole or in part, from the processing of the work material 12. The local environment 36 can thus typically include material deliberately delivered to facilitate processing, such as a shielding gas or sintering powder; material ejected or vaporized from the work material 12; and material formed by reactions between delivered material and the work material 12, or between by-products or intermediate products thereof formed during processing. The laser beam of optical energy 32 can interact with the local environment 36 as well as the work material 12 and, for example, promote or hinder reactions, changes of state, etc. For example, the local environment 36 can include a plasma formed during the processing of the work material 12 with the laser beam of optical energy 32.

The laser processing of the work material 12 can have associated therewith an optical signature, which refers generally to any optically detectable phenomenon associated with the laser processing of the work material 12. For example, the optical signature can include features of the plasma noted above, such as an optical absorption or emission associated with the plasma. Absorption can be determined by probing with a test beam of optical energy and determining the attenuation of the beam by receiving the beam after propagation through the local environment 36. Or, in certain processing scenarios there can be a nonlinear interaction between the laser beam of optical energy 32 and the work material 12 or an element within the local environment 36 such that optical energy having a wavelength different from that of the laser beam of optical energy 32 is generated. Detecting higher order modes of optical energy can provide useful information regarding an optical signature, such as, for example, such a non-linear process, and such information can be used in a feedback loop to adjust or vary the laser processing of the material with the laser beam of optical energy 32. As yet another example, the optical signature can include blackbody radiation from the work material 12, or from the local environment 36, from which optical signature a temperature can be approximated by fitting an equation to the measured blackbody radiation spectrum.

FIGS. 1A and 1B can differ with regard to the way in which optical energy representative of the optical signature is captured and/or propagated through the system 10A or 10B for analysis. In a first example according to FIG. 1A, optical energy representative of the optical signature propagates through free space and to the laser head 30. The laser head 30 can include an arrangement of optical elements (e.g., lenses 84) for conditioning (e.g., focusing or collimating) the laser beam of optical energy 32 prior to delivery of the beam to the work material 12. The optical waveguide 54A (e.g., an optical fiber) can be mounted with the laser head 30 such that one end of the optical fiber receives optical energy representative of the optical signature. For example, optical fiber can be terminated within the laser head 30. The lens or lens system can facilitate the reception of the optical energy representative of the optical signature. For example, the optical waveguide can be positioned so as to receive optical energy characteristic of the optical signature after that optical energy has been transmitted (or even simply diffracted or scattered) by such a lens or lens system within the laser head 30. If appropriate, the laser head 30 can include a second optical element system 86, which can comprise one or more lenses, to facilitate directing at least some of the optical energy representative of optical signature into the delivery fiber 22. The optical energy representative of a characteristic of the optical signature is propagated by the delivery fiber 22 in a direction opposite to that of the laser beam of optical energy used for laser processing the work material 12. The laser processing system 10A can include a tap coupler 88, such as a WDM, to couple optical energy representative of the optical signature from the delivery optical fiber 22 after it has propagated along a selected length thereof for delivery of the optical energy to the analysis unit 60, as shown in FIG. 1A.

Alternatively, a second optical waveguide (e.g., a second optical fiber) 54A can be provided for propagating optical energy representative of optical signature part or all of the way to the analysis unit 60. Although shown in FIG. 1A as being routed separately from the delivery optical fiber 22, the second optical fiber 54A can be bundled with the delivery fiber 22 for at least part of its length so as to be part of a common optical fiber cable. If appropriate, the optical element system 86 can be designed to couple or divert the optical energy representative of the optical signature to the second optical fiber 54A. In certain practices, there may be sufficient optical energy representative of the optical signature scattered or diffracted within the laser head 30 such that the optical fiber 54A can simply be positioned within the laser head, with little or no optics needed for adequate optical energy to be captured. Similar considerations can apply to capturing the optical energy when the delivery fiber itself is used to propagate the energy for analysis by the analysis unit 60.

As discussed in more detail below, the analysis unit 60 can be adapted and configured to, for example, determine the nature of the sensed optical spectrum and/or time domain features. The analysis unit can include optoelectronic components such as, for example, filters, photodiodes, gratings, prisms, charge coupled devices (CCDs), optical spectrum analyzers (OSAs), photomultiplier tubes, spectra graphs, and time domain sampling devices.

In a second example according to the disclosure, and as illustrated in FIG. 1B, a laser system 10B can include a separate capture head 89 for capturing optical energy representative of the optical signature. The laser system 10B can include optical waveguide 54B, typically an optical fiber, for propagating optical energy representative of the optical signature from the capture head 89 for delivery to the analysis unit 60. The capture head 89 can comprise one or more optical elements. In its simplest form the capture head 89 may simply comprise the end of the optical fiber 54B, which can be cleaved and/or lensed according to techniques known in the art. The capture head 89 can be separate from or mounted with (e.g., on the outside of) the laser head 30 such that it moves with the laser head 30 so as to facilitate its being in a favorable position to receive optical energy representative of a characteristic of the optical signature. In this example the optical energy received by the optical waveguide 54B need not be affected by a lens or lens arrangement of the laser head 30 that conditions the laser beam of optical energy 32.

Although the optical fiber 54B is shown in FIG. 1B as being separate from the laser delivery fiber 22, it can of course be bundled with the laser delivery fiber 22 into a single optical fiber cable, as noted above in conjunction with the discussion of FIG. 1A. Although not shown in FIG. 1B, it can also be possible to couple energy from the optical fiber 54B onto the laser delivery fiber 22 using an appropriate tap coupler or WDM to use at least a part of the length of the delivery fiber 22 to carry the optical energy to the analysis unit 60. A second optical coupler, as shown in FIG. 1A by reference numeral 88, can be used to couple the optical energy from the laser delivery fiber 22 for analysis by the analysis unit 60.

The laser processing systems 10A and 10B can include lenses that are not involved in conditioning of the laser beam of optical energy 32 but that facilitate optical waveguides 54A and/or 54B receiving optical energy. Such lenses can be formed on the end of the optical waveguide 54A or 54B, for example, if the waveguide comprises an optical fiber.

The laser processing systems 10A and 10B can be configured such that the controller 40 varies at least one processing parameter of the laser processing of the work material 12 responsive to the sensing of a characteristic (e.g., an optical emission resulting from an upconversion process) of the optical signature. For example, regarding the aforementioned fitting of spectrum data to the expression for blackbody radiation to determine a temperature, a processing parameter having an effect on the determined temperature, such as, for example, average laser power (which can be varied in a variety of ways, such as, for example, by varying one or more of repetition rate, energy per pulse, duty cycle, CW power, etc.), can be adjusted responsive so as to raise or lower the temperature as desired.

The ability to determine and adjust temperature of the work material 12 or the local environment 36 can be advantageous in the processing of materials such as metals, plastics, and the like where localized heat control, particularly such control with a relative fast response time to a temperature change, can be of interest. The ability to adjust or vary temperature in medical applications such as ablating, cutting, cauterizing, tissue removal, cancer treatments, etc. can also be of interest. It is noted that determining a temperature is meant to include determining a value having a known and relied upon relationship to a temperature.

Figure 2A:
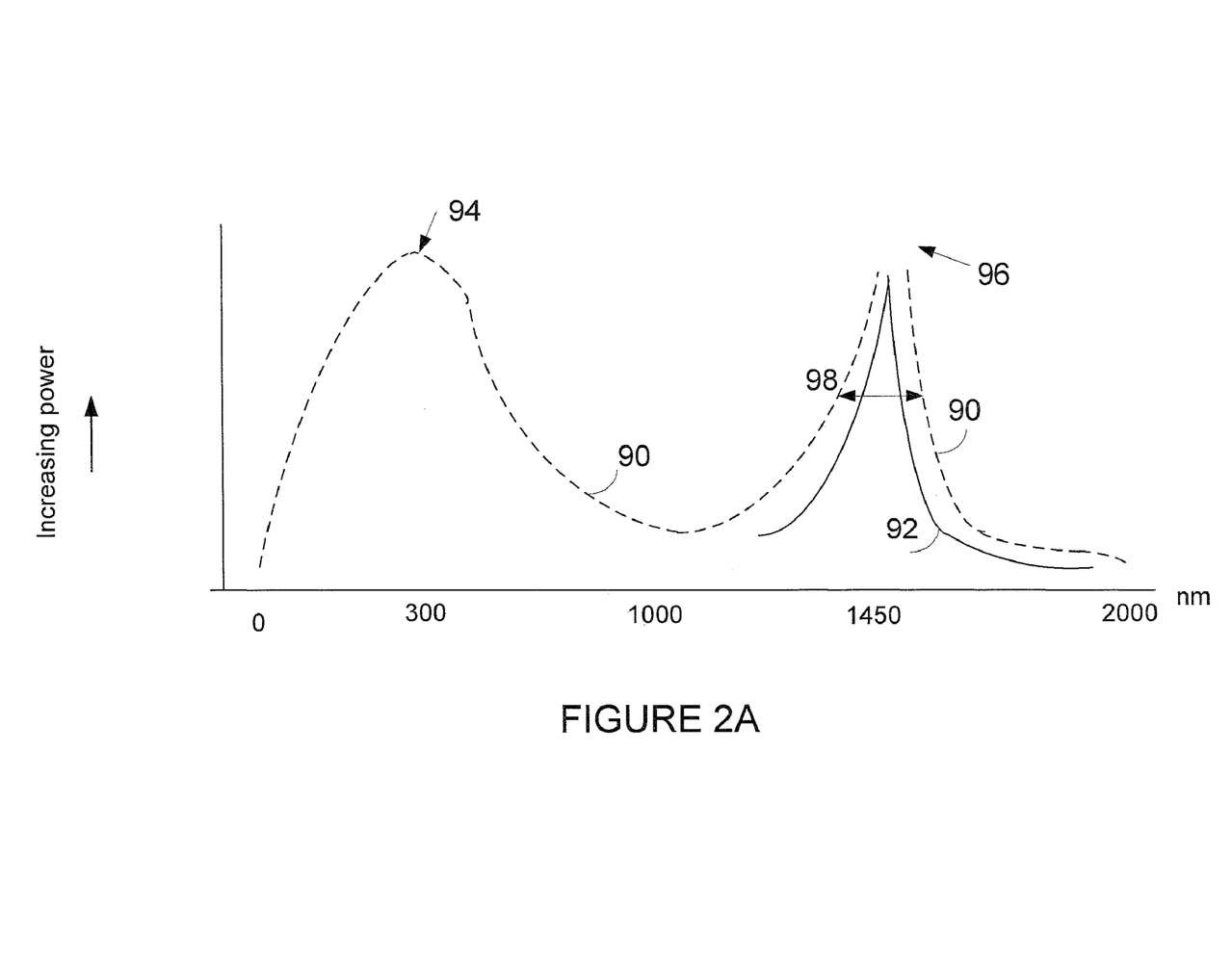
FIG. 2A is a representation of a possible spectral power distribution associated with an optical signature.

Referring to FIG. 2A, the spectral distribution curve 90 can be compared to a second spectral distribution curve 92 that can be used as a reference to sense changes and to adjust control of the laser processing power accordingly. As one example, the spectral distribution curve 90 can be taken as representative of the generation of a plasma in the vicinity of work material 12, the plasma causing the curve 90 to differ from the second spectral distribution curve 92 at least by the emergence of the additional emission peak 94 at or around 300 nm as well as an upward shift 96 in the power level of the peak emission and broadening of the width 98. Such differences could in certain practice indicate that an adjustment of the nature of the energy delivered to work material 12 is warranted, and such adjustment could be made via altering an appropriate processing parameter.

Figure 2B:
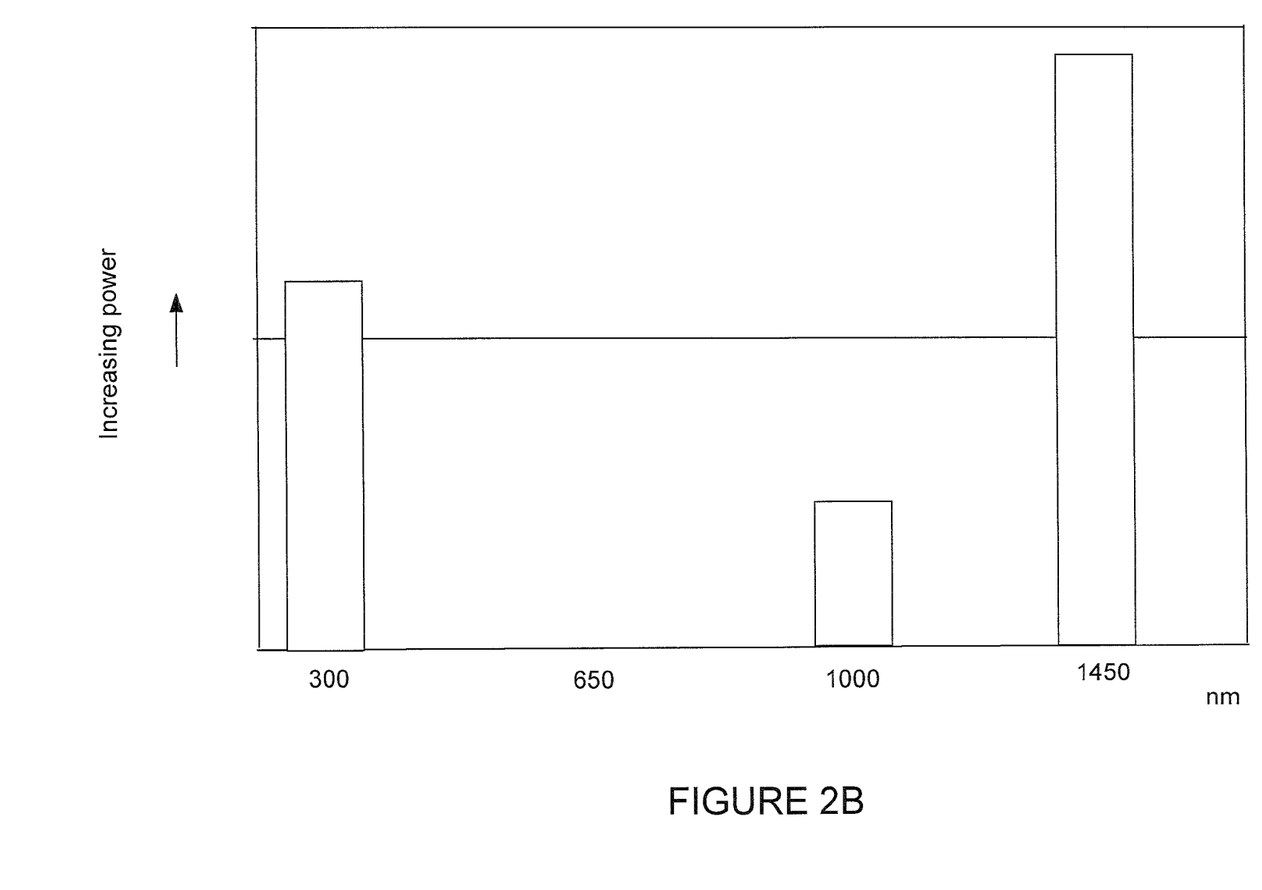
FIG. 2B is a sample histogram indicating power levels associated with an optical signature within different wavelength bands of the spectral power distribution shown in FIG. 2A.

FIG. 2B is a representation of a histogram that could be constructed from the outputs of bandpass filter components, described in more detail below, within analysis unit 60. The filter components may extract, for example, spectral power levels centered about the wavelengths of 300 nm, 1000 nm and 1450 nm. Criteria for determining that the plasma noted above has been generated can include one or more of the detection of power at 300 nm and 1000 nm as well as an appropriate change in the power detected at 1450 nm.

Process parameters that can be adjusted responsive to sensing one or more characteristics of the optical signature can include one or more of, for example, positioning of the laser beam 32 relative to the work material 12, including the location and orientation of the beam relative to the work material 12 as well as the relative movement therebetween. As another example, process parameters that can be adjusted responsive to a characteristic of the optical signature can include the energy, power, depth of focus, or spot size of the laser beam of optical energy, or, additionally, the location of the focal point relative to the surface of the work material 12. Other adjustable process parameters include pulse shape, temporal width, energy, or repetition rate. In some cases, certain processing parameters can be adjusted responsive to sensing the same characteristic of the optical signature, though perhaps according to different functional relationships; on the other hand, and perhaps in conjunction with the foregoing, it is also expected that different processing parameters will be adjusted responsive to different characteristics of the optical signature. In some aspects, the flexibility allowed by embodiments of the disclosure can allow a single laser system to be used for multiple applications, thus reducing commercial setup costs and setup times. A processing parameter can include any suitable feature of the laser processing procedure that can be beneficial to adjust or vary, and includes of course all such processing parameters identified herein as examples.

Similarly, there is a wide variety of optical characteristics of the optical signature that can be of interest, including, for example, the optical energy of a harmonic of at least a second order of a non-linear process; a wavelength spectrum; an absorption spectrum; optical energy generated by an upconversion process; optical energy generated by a downconversion process; a temporal aspect of radiated optical energy; a polarization state; or a variation with time of an intensity versus wavelength distribution of the radiated optical energy.

Laser processing systems 10A and 10B of the disclosure, in certain embodiments, can include one or both of the optical waveguides 54A and 54B. For example, it may be advantageous for one of the optical waveguides 54A or 54B to launch a "probe" beam of optical energy and for the other of the optical waveguides 54A and 54B to propagate optical energy received responsive to the probe beam. For example, it may be desirable to measure a transmission spectrum of the local environment, and the probe beam may include a broad range of wavelengths, such as those that can be generated by a supercontinuum fiber laser. It may be advantageous to position the ends of the optical waveguides 54A and 54B in a substantially collinear configuration such that a beam emanated from one of the waveguides is more likely to be directly received by the other of the waveguides. In other cases it may be acceptable for the beam to be scattered or reflected, such as from the work material 12, before being received by one or the other of the optical waveguides. In certain embodiments the delivery fiber can launch a probe beam.

The probe beam may be attenuated or otherwise transformed before being received, in which case a characteristic of the transformation can be the characteristic of the optical signature of interest. For example, in one practice of the disclosure, the material delivery system 70 can provide a shielding gas to shield the processing of the work material 12 with the laser beam of optical energy 32 from an undesired concentration of oxygen. A probe beam having a selected wavelength that is absorbed by oxygen can be directed toward the local environment 36 by one of the optical waveguides 54A and 54B. Other waveguides may then be positioned so as to receive the optical energy having the selected wavelength after transmission of the probe beam through the local environment 36. The strength of the received optical energy having the selected wavelength can be related to the concentration of oxygen in the local environment, and an appropriate process parameter, such as the rate of flow of the shielding gas, adjusted accordingly.

One or both of the optical waveguides 54A and 54B can comprise either single mode or multimode optical fiber. Single mode optical fiber can be preferable for certain analyses of pulsed optical energy. Additionally, one or both of the optical waveguides 54A or 54B can comprise photonic crystal fiber for better transmission in the visible wavelength region or can comprise radiation hardened fiber for better transmission in the ultra-violet wavelength region. The optical waveguide 54A or 54B can comprise polarization maintaining (PM) optical fiber to aid in determining the polarization state of the optical signature. The laser deliver fiber 22 typically comprises a multimode fiber, thought it can also comprise a single mode fiber. In certain embodiments the laser delivery fiber can comprise a large mode area (LMA) single mode fiber, such as photonic crystal fiber or appropriately designed conventional fiber.

As noted above, the laser processing systems 10A and 10B can include an analysis unit 60 for facilitating varying a process parameter responsive to a characteristic of the optical signature. The analysis unit can convert optical energy propagated by the one of the optical waveguides 54A or 54B to electrical signals for provision to the controller 40. The analysis unit 60 can comprise hardware and/or software as required to detect the desired characteristic of the optical signature. For example, if it is desired to determine temporal stretching of a pulse due to a dispersive effect on a pulse of optical energy of the laser beam 32 as part of reflection from the work material 12 and/or transmission through or reflection from the local environment 36, the analysis unit 60 can include an appropriate optical receiver. Temporal stretching can be determined by comparison of the received pulse to the duration of the pulse of the laser beam of optical energy 32 directed to the work material 12 (which could be sampled via an appropriate tap coupler for coupling a portion of the optical energy from the laser from the delivery fiber 22). Other temporal aspects of interest can include pulse shape transformation, such that the shape of the pulse as a function of time is changed from that of the laser beam of optical energy 32.

Figure 3A:
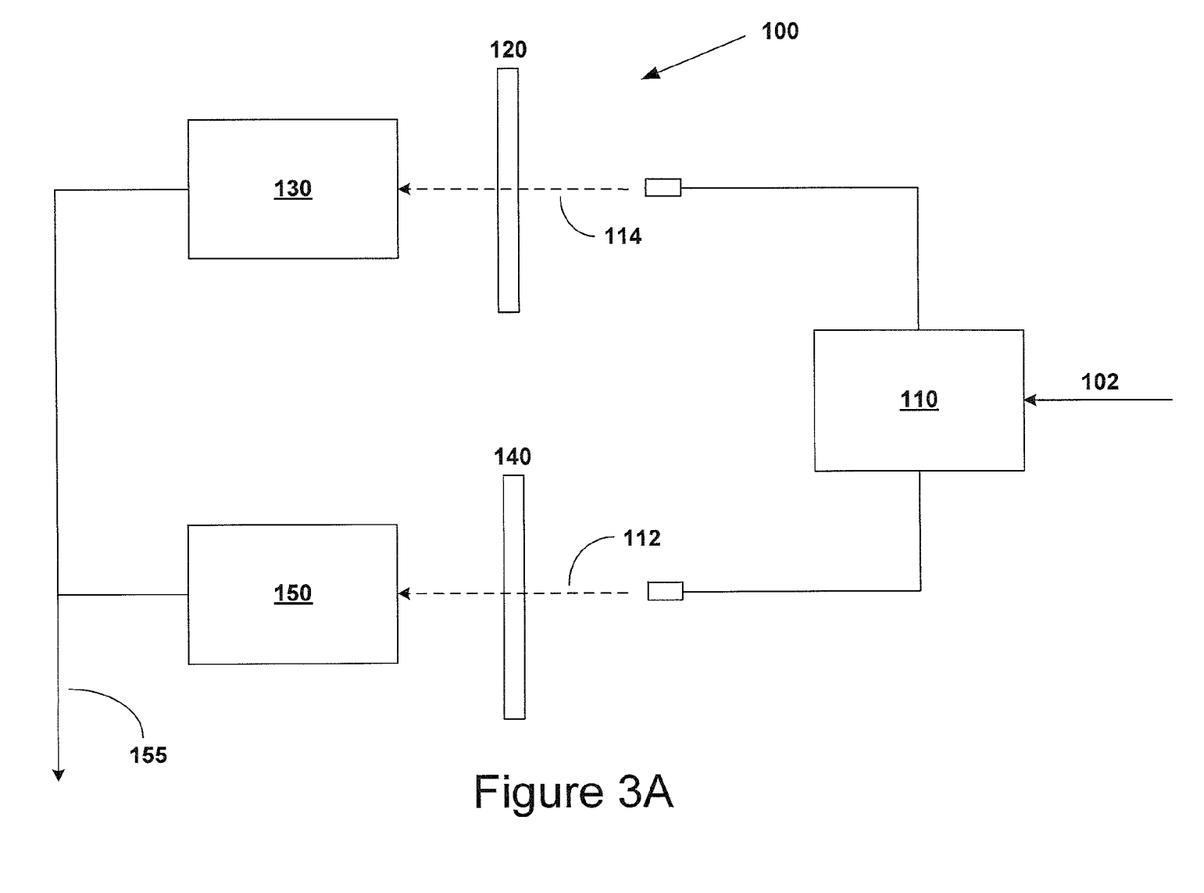
FIG. 3A schematically illustrates one example of an architecture for performing a simple optical spectrum analysis.

As another example, where the characteristic of interest of the optical signature comprises spectral information, the analysis unit can comprise, for example, a commercially available spectrum analyzer, such as, for example, the Yokogawa AQ6319 Optical Spectrum Analyzer or the Anritsu MS9780A Optical Spectrum Analyzer. In some practices of the disclosure an analysis unit 60 can comprise, as shown in FIG. 3A, a spectrum analysis architecture 100 comprising an optical coupler or splitter 101 for splitting incident optical energy 102 received from, for example, the optical waveguide 54A into the two transmission paths 112 and 114. The optical filters 120 and 140 have different transmission characteristics, so that they, for example, pass different wavelengths or wavelength bands, such that the photodetectors 130 and 150 provide signals that are responsive to the amount of optical energy at different wavelengths within the spectrum.

The apparatus of FIG. 3A can provide a simple two-channel spectrum analyzer. Additional channels can be added by providing an n-way coupler or splitter, where n is greater than 2, and additional filters and photodetectors. For example, three paths, three filters and three detectors could be used to generate the histogram of FIG. 2B. The spectrum analysis architecture 100 can provide an output 155 to the controller 40 or to intermediate circuitry such that the controller 40 can make use of the spectral information from the filtered photodetectors 130 and 150. "Photodetector," as used herein, can include a photodiode, phototransistor, photoresistor, a charge-coupled device (CCD), or any other detector used for detecting optical energy.

Figure 3B:
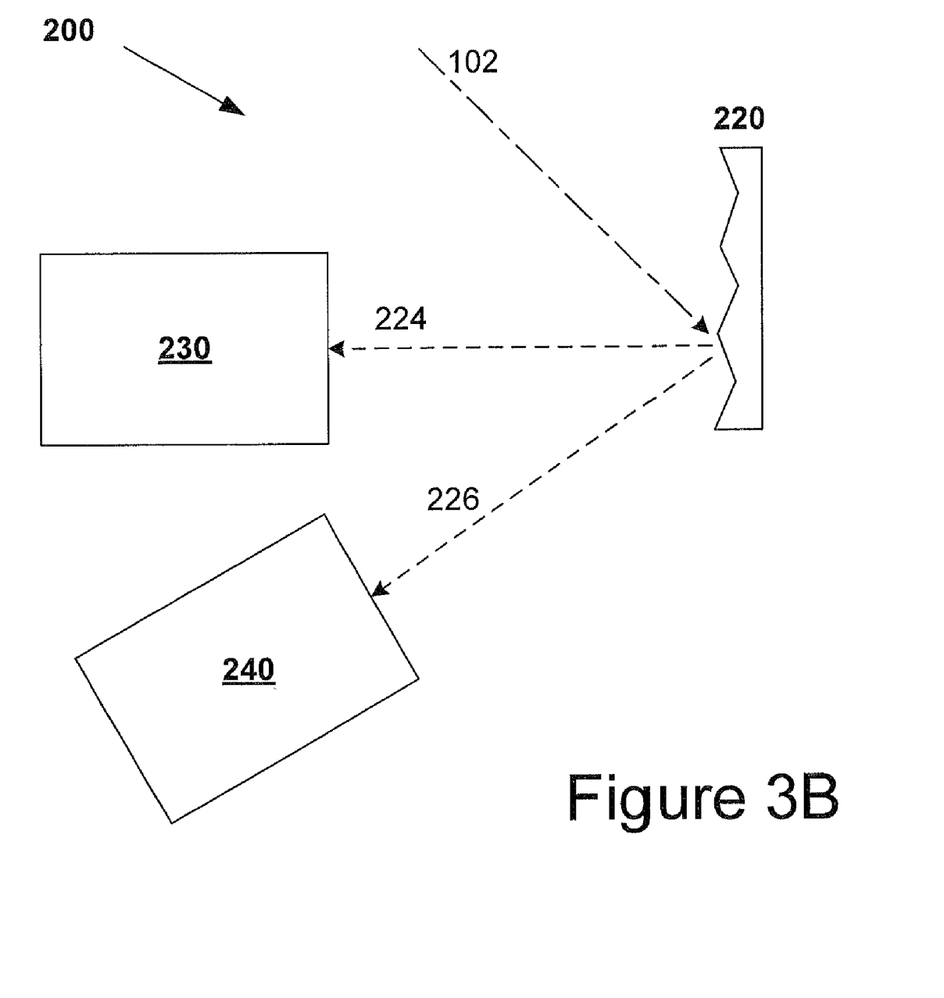
FIG. 3B schematically illustrates a second example of an architecture for performing a simple optical spectrum analysis.

FIG. 3B schematically illustrates the architecture of a second apparatus 200 that can provide spectral analysis of the optical signature. In FIG. 3B, a grating 220 spatially separates incident optical energy 102 into constituent wavelengths represented by light beams 224 and 226. Photodetectors 230 and 240 are then placed at different angles so as to detect light energy at these different wavelengths. Additional photodetectors can be included to increase the number of channels so as to detect additional wavelengths or to increase the spectral resolution. In one variation, the photodetectors 230 and 240 can be replaced by a CCD array.

As noted above, the optical signature can have temporal aspects that are of interest. As another example of the foregoing, the spectral makeup of the pulse can vary with time as well, and it may be useful in certain practices of the disclosure to adjust a parameter of the laser processing responsive, for example, to a pulse chirp that is imposed on a pulse due to an interaction of the laser beam of optical energy 32 with the work material 12 or the local environment 36. The apparatus schematically illustrated in FIGS. 3A and 3B may be of use in this regard, coupled with appropriate processing hardware and/or software.

Figure 4:
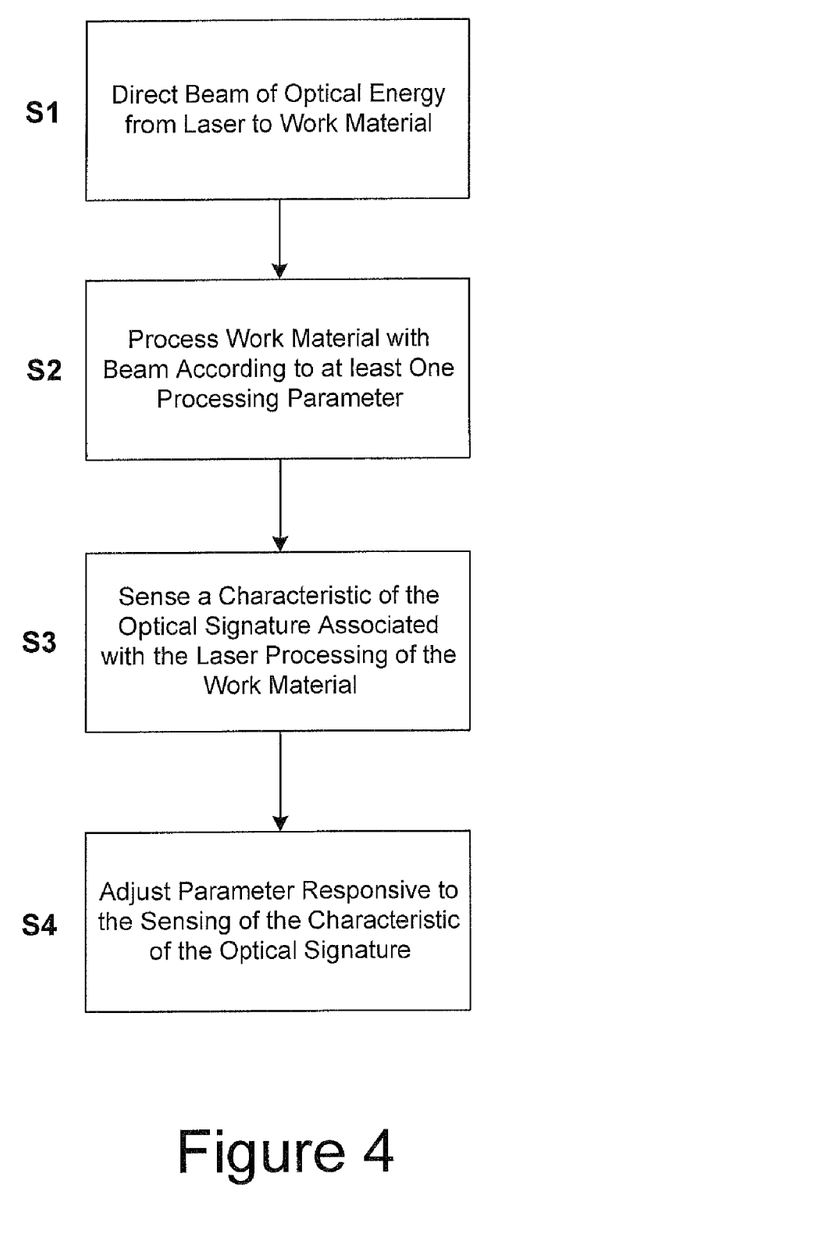
FIG. 4 schematically illustrates an example of general steps for processing a work material according to one practice of the disclosure.

FIG. 4 schematically illustrates steps of one example of a method for processing a work material according to the disclosure. Step S1 includes directing a laser beam of optical energy from a laser to a work material. Step S2 includes processing the work material with the laser beam of energy in accordance with at least one processing parameter to modify the work material. Step S3 comprises sensing a characteristic of the optical signature associated with the laser processing of the work material. In Step S4 the at least one processing parameter is adjusted responsive to the sensing of the characteristic of the optical signature.

Several embodiments of the invention have been described and illustrated herein. Those of ordinary skill in the art will readily envision a variety of other means and structures for performing the functions and/or obtaining the results or advantages described herein and, each of such variations or modifications is deemed to be within the scope of the present invention. For example, although an embodiment described herein includes two ring-shaped core regions and an inner core (which can comprise a central core), the disclosure is not limited to optical fiber having just two ring-shaped core regions, and an optical fiber having more than two ring-shaped core regions is considered within the scope of invention. More generally, those skilled in the art would readily appreciate that all parameters, dimensions, materials and configurations described herein are meant to be exemplary and that actual parameters, dimensions, materials and configurations will depend on specific applications for which the teaching of the present disclosure is used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time).

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red.

Having described the invention, what is claimed as new and to be secured by Letter Patent is:

1. A method of processing a work material using a laser, comprising;
    directing a laser beam of optical energy from a laser to a work material;
    processing the work material with the laser beam of optical energy in accordance with at least one processing parameter to modify the work material, the processing of the work material having associated therewith an optical signature;
    sensing a characteristic of the optical signature carried by the laser beam; and
    varying the at least one processing parameter responsive to the sensing of the characteristic of the optical signature.

2. The method of claim 1 wherein sensing a characteristic of the optical signature comprises providing a first optical fiber so as to propagate optical energy representative of the optical signature.

3. The method of claim 2 wherein directing a laser beam of optical energy from the laser to the work material comprises providing a delivery optical fiber and propagating optical energy of the laser beam with the delivery optical fiber, and wherein said first optical fiber and said delivery optical fiber are the same optical fiber.

4. The method of claim 3 comprising providing a laser head at one end of the delivery optical fiber, the laser head comprising at least one optical element for conditioning the laser beam of optical energy prior to delivery of the beam to the work material for the processing, thereof, said optical element in addition facilitating reception by the delivery optical fiber of optical energy representative of the optical signature.

5. The method of claim 2 wherein directing a laser beam of optical energy from the laser to the work material comprises providing a delivery optical fiber and propagating optical energy of the laser beam with the delivery optical fiber, and wherein said first optical fiber and the delivery optical fiber are not the same optical fiber.

6. The method of claim 5 comprising providing a laser head at one end of the delivery optical fiber, the laser head comprising at least one optical element for conditioning the laser beam of optical energy prior to delivery of the beam to the work material for the processing thereof and wherein providing the first optical fiber comprises mounting the first optical fiber with the laser head such that an end of the first optical fiber receives the optical energy representative of the optical signature.

7. The method of claim 6 wherein the optical element also facilitates the reception of the optical energy representative of the optical signature by the first optical fiber.

8. The method of claim 5 wherein said first optical fiber and said delivery optical fiber are bundled together at least along a portion of their respective lengths.

9. The method of claim 1 wherein sensing a characteristic of the optical signature comprises providing a single mode optical fiber so as to propagate optical energy representative of the optical signature, and wherein directing a laser beam of optical energy from the laser to the work material comprises providing a multimode delivery optical fiber and propagating the laser beam of energy along a multimode delivery optical fiber.

10. The method of claim 1 wherein sensing a characteristic of the optical signature comprises sensing optical energy generated by a non-linear process.

11. The method of claim 10 wherein sensing optical energy generated by a non-linear process comprises sensing light of a wavelength of at least a second order harmonic of the non-linear process.

12. The method of claim 1 wherein sensing a characteristic of the optical signature comprises sensing a wavelength spectrum.

13. The method of claim 1 wherein sensing a characteristic of the optical signature comprises sensing a temporal aspect of optical energy.

14. The method of claim 13 wherein sensing a temporal aspect comprises sensing the variation with time of an intensity versus wavelength distribution of the radiated optical energy.

15. The method of claim 1 wherein sensing a characteristic of the optical signature comprises sensing a polarization state of optical energy.

16. The method of claim 1 wherein sensing a characteristic of the optical signature comprises sensing an absorption spectrum.

17. The method of claim 1 wherein processing the work material with the laser beam of optical energy includes creating a local processing environment, and wherein sensing a characteristic of the optical signature comprises sensing a feature of the local processing environment.

18. The method of claim 1 wherein sensing a characteristic of the optical signature comprises sensing optical energy generated by an upconversion process.

19. The method of claim 1 wherein sensing a characteristic of the optical signature comprises sensing optical energy generated by a downconversion process.

20. The method of claim 1 wherein the laser beam of optical energy comprises one or more wavelengths and wherein sensing a characteristic of the optical signature comprises sensing optical energy having a wavelength other than a wavelength comprised by the laser beam of optical energy.

21. The method of claim 1 wherein the laser beam of optical energy comprises a first wavelength having an intensity that is higher than another wavelength comprised by the laser beam of optical energy, and wherein sensing a characteristic of the optical signature comprises sensing so as to be most responsive to the another wavelength.

22. The method of claim 1 comprising determining, responsive to sensing a characteristic of the optical signature, a temperature associated with the processing of the work material with the laser beam of optical energy and wherein varying at least one processing parameter responsive to the sensing of the at least one optical characteristic of the optical signature comprises varying at least one processing parameter responsive to the determined temperature.

23. The method of claim 1 wherein processing the work material with the laser beam of optical energy comprises positioning the laser beam of optical energy relative to the work material, and wherein varying the at least one processing parameter comprises varying the positioning of the laser beam of optical energy relative to the work material.

24. The method of claim 23 wherein varying the positioning of the laser beam of optical energy relative to the work material comprises varying the speed of relative movement between the work material and the laser beam of optical energy.

25. The method of claim 23 wherein varying the positioning of the laser beam of optical energy relative to the work material comprises varying an angle between the laser beam of optical energy and a surface of the work material.

26. The method of claim 1 further comprising directing a flow of material to the work material, and wherein varying the at least one processing parameter comprises varying at least one of the flow and constitution of the material.

27. The method of claim 26 wherein the material comprises a sintering material to be sintered by the laser beam of optical energy.

28. The method of claim 26 wherein directing a flow of material to the work material comprises directing a flow of a gas.

29. The method of claim 1 wherein varying the at least one processing parameter comprises varying the optical power of the laser beam of optical energy.

30. The method of claim 1 wherein varying the at least one processing parameter comprises varying the spot size of the laser beam of optical energy.

31. The method of claim 1 comprising focusing the laser beam of optical energy, and wherein varying the at least one processing parameter comprises varying the focus of the laser beam of optical energy.

32. The method of claim 1 wherein varying the at least one processing parameter comprises varying the polarization state of the laser beam of optical energy.

33. The method of claim 1 wherein varying the at least one processing parameter comprises varying the wavelength of the laser beam of optical energy.

34. The method of claim 1 wherein the laser beam of optical energy comprises a pulsed laser beam, and wherein varying the at least one processing parameter comprises varying at least one of the pulse energy, pulse duration, pulse repetition rate or duty cycle of the laser beam of optical energy.

35. The method of claim 1 wherein the laser beam of optical energy comprises a pulsed laser beam of optical energy having a wavelength, and wherein sensing a characteristic of the optical signature comprises providing a first optical fiber so as to propagate optical energy of the optical signature, the first optical fiber being a single mode fiber capable of propagating the wavelength.

* * * * *